(12) United States Patent
Horiuchi et al.

(10) Patent No.: US 10,031,900 B2
(45) Date of Patent: Jul. 24, 2018

(54) RANGE ADJUSTMENT FOR TEXT EDITING

(71) Applicant: International Business Machines Corporation, Armonk, NY (US)

(72) Inventors: Yoshio Horiuchi, Kanagawa-ken (JP); Harumi Itoh, Machida (JP); Tadahiko Nakamura, Kanagawa-ken (JP); Masato Suzuki, Saitama-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 439 days.

(21) Appl. No.: 14/887,735

(22) Filed: Oct. 20, 2015

(65) Prior Publication Data

US 2016/0110331 A1    Apr. 21, 2016

Related U.S. Application Data

(63) Continuation of application No. 14/067,067, filed on Oct. 30, 2013, now Pat. No. 9,208,138.

(30) Foreign Application Priority Data

Nov. 14, 2012   (JP) ................. 2012-250546

(51) Int. Cl.
  *G06F 17/00*    (2006.01)
  *G06F 17/24*    (2006.01)
  (Continued)

(52) U.S. Cl.
  CPC ............ *G06F 17/24* (2013.01); *G06F 3/0488* (2013.01); *G06F 3/04842* (2013.01); *G06F 17/3064* (2013.01)

(58) Field of Classification Search
  CPC .... G06F 17/3064; G06F 17/24; G06F 3/0488; G06F 3/04842
  See application file for complete search history.

(56) References Cited

U.S. PATENT DOCUMENTS 5,864,805 A * 1/1999 Chen ............... G10L 15/22
                                                704/235
6,789,231 B1 * 9/2004 Reynar ............ G06F 17/276
                                                704/4
(Continued)

FOREIGN PATENT DOCUMENTS

JP      05035837 A    2/1993
JP      08123621 A    5/1996
(Continued)

OTHER PUBLICATIONS

Superuser, "Smart Word Selection in IE—how to disable?", superuser, Aug. 24, 2009, 2 pages.*

(Continued)

*Primary Examiner* — Cesar Paula
*Assistant Examiner* — David Faber
(74) *Attorney, Agent, or Firm* — Cantor Colburn LLP

(57) ABSTRACT

Embodiments relate to text editing. An aspect includes receiving a range specifying operation for performing range specification for at least part of the text displayed on a display device of the computer. Another aspect includes causing a storing unit to store therein specific text including text in the range specified by the received range specifying operation and other text relating to the specified range. Another aspect includes receiving a changing operation for changing the text in the specified range. Another aspect includes determining whether or not a change beyond a specific criterion has occurred in the text in the range specified by the received range specifying operation. Another aspect includes displaying the specific text stored in the storing unit on the display device based on determining that a change beyond the specific criterion has occurred in the text in the range.

20 Claims, 14 Drawing Sheets

(51) Int. Cl.
*G06F 3/0484* (2013.01)
*G06F 3/0488* (2013.01)
*G06F 17/30* (2006.01)

(56) References Cited

U.S. PATENT DOCUMENTS

| | | | | |
|---|---|---|---|---|
| 7,546,529 | B2* | 6/2009 | Reynar | G06F 17/276 704/235 |
| 7,574,675 | B1* | 8/2009 | Linker | G06F 17/24 715/767 |
| 7,603,349 | B1* | 10/2009 | Kraft | G06F 17/30867 |
| 9,208,138 | B2 | 12/2015 | Horiuchi et al. | |
| 9,318,108 | B2* | 4/2016 | Gruber | G10L 15/1815 |
| 2001/0016840 | A1* | 8/2001 | Hijikata | G06F 17/30905 |
| 2002/0080179 | A1* | 6/2002 | Okabe | G06F 3/0486 715/769 |
| 2005/0005240 | A1* | 1/2005 | Reynar | G06F 17/276 715/257 |
| 2013/0132832 | A1* | 5/2013 | Nakamura | G06F 17/24 715/271 |
| 2015/0100524 | A1* | 4/2015 | Pantel | G06F 17/3053 706/12 |

FOREIGN PATENT DOCUMENTS

| | | |
|---|---|---|
| JP | 08278966 A | 10/1996 |
| JP | 09160914 A | 6/1997 |
| JP | 10198743 A | 7/1998 |
| JP | 2000048014 A | 2/2000 |
| JP | 2005032021 A | 2/2005 |
| JP | 2006196026 A | 7/2006 |
| JP | 2006338458 A | 12/2006 |
| JP | 2007094818 A | 4/2007 |
| JP | 2011128864 A | 6/2011 |

OTHER PUBLICATIONS

Kurlander et al, "Editable Graphical Histories", Columbia University, 8 pages.*
Camarda, Bill, "Special Edition Using® Microsoft® Office Word 2003", Que Publishing, Dec. 12, 2003, 7 pgs + 1 cover page, 8 pages total.*
ExtendOffice.com, "How to easily undo all changes in Word document?", ExtendOffice.com, Oct. 17, 2012, 3 pages.*
Harkins, Susan, "15 ways to select text in a Word document", TechRepublic, Aug. 15, 2011, 8 pages.*

* cited by examiner

FIG. 3(a)

In this example, the Rational Web Platform (RWP) server is named RWP-Server_1 will be used. The new CCRC download bits have been added to this server and can be accessed using the following URL: [http://RWP-Server_1/ccrc/update]

FIG. 3(b)

In this example, the Rational Web Platform (RWP) server is named RWP-Server_1 will be used. The new CCRC download bits have been added to this server and can be accessed using the following URL: http://RWP-Server_1/ccrc/update

FIG. 3(c)

In this example, the Rational Web Platform (RWP) server is named RWP-Server_1 will be used. The new CCRC download bits have been added to this server and can be accessed using the following URL: http://RWP-Server_1/ccrc/update

FIG. 6(a)

In this example, the Rational Web Platform (RWP) server is named RWP-Server_1 will be used. The new CCRC download bits have been added to this server and can be accessed using the following URL: http://RWP-Server_1/ccrc/update

FIG. 6(b)

http://RWP-S
http://RWP-
http://RWP
http://RW
http://R
http://
http:/
http:
http
htt
ht
h

FIG. 7(a)

In this example, the Rational Web Platform (RWP) server is named RWP-Server_1 will be used. The new CCRC download bits have been added to this server and can be accessed using the following URL: http://RWP-Server_1/ccrc/update

to this server and can be accessed using the following URL:
http://RWP-Server_1/ccrc/update
http://RWP-Server_1/ccrc/updat
http://RWP-Server_1/ccrc/upda
http://RWP-Server_1/ccrc/upd
http://RWP-Server_1/ccrc/up
http://RWP-Server_1/ccrc/u
http://RWP-Server_1/ccrc/
http://RWP-Server_1/ccrc
http://RWP-Server_1/ccr
. . .

50

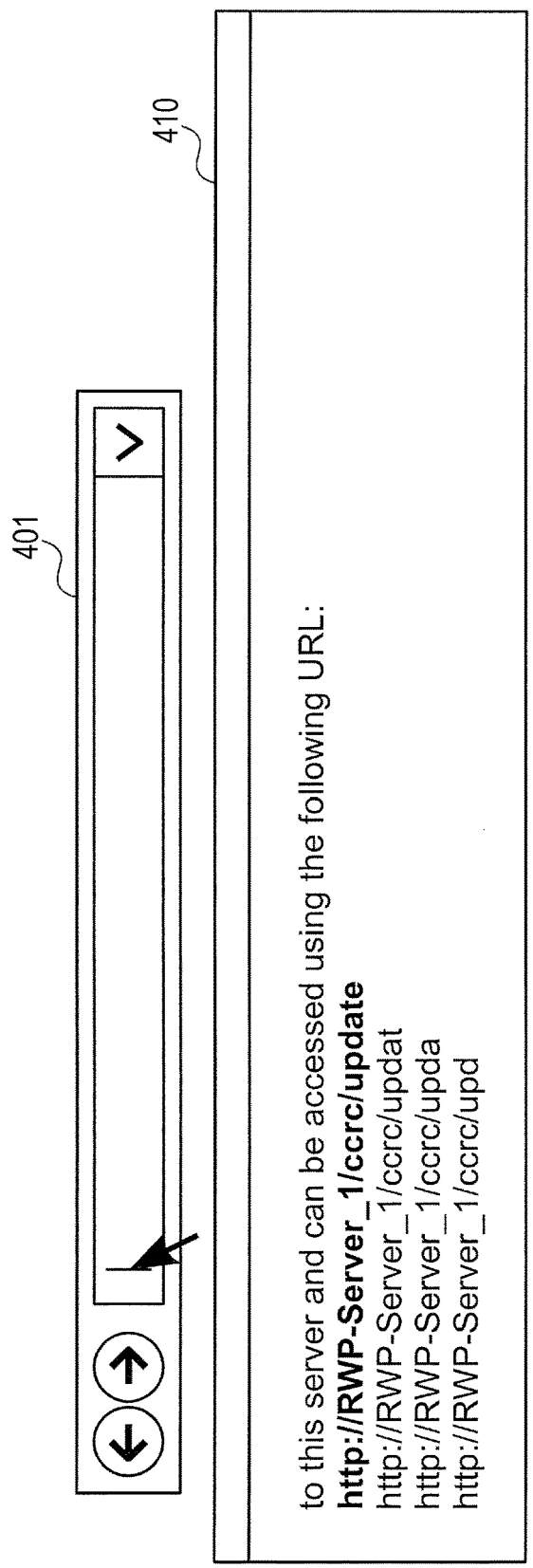

FIG. 10(a)

In this example, the Rational Web Platform (RWP) server is named RWP-Server_1 will be used. The new CCRC download bits have been added to this server and can be accessed using the following URL: http://RWP-Server_1/ccrc/update

In this example, the Rational Web Platform (RWP) server is named RWP-Server_1 will be used. The new CCRC download bits have been added to this server and can be accessed using the following URL: http://RWP-Server_1/ccrc/update

200

1002

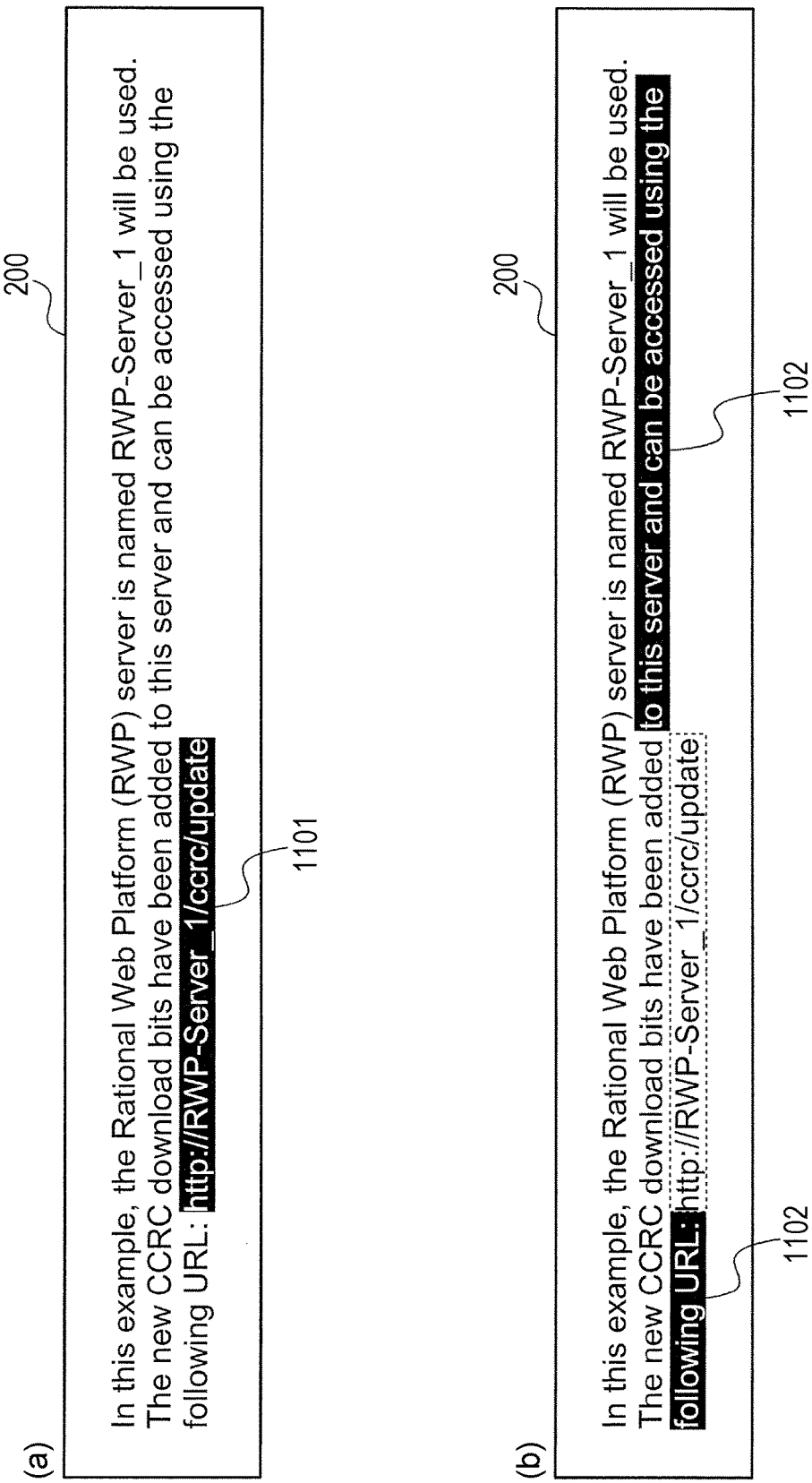

RANGE ADJUSTMENT FOR TEXT EDITING

This application is a continuation of U.S. patent application Ser. No. 14/067,067, filed Oct. 30, 2013, which claims priority to Japan Patent Application No. 2012-250546, filed Nov. 14, 2012, and all the benefits accruing therefrom under 35 U.S.C. § 119, the contents of which in its entirety are herein incorporated by reference.

BACKGROUND

This disclosure relates generally to editing text, and more specifically, relates to range adjustment for text editing.

For editing of text data, a computer may perform an operation for specifying an appropriate range of text displayed on the screen of a display device, copying or cutting the text in the specified range, and pasting the text to a different position. Range specification for text is performed using a pointing device, such as a mouse or a cursor key on a keyboard, by specifying the positions of the ends of a range to be specified while moving the pointing device displayed on the screen of the display device.

SUMMARY

Embodiments include a method, system, and computer program product for text editing. An aspect includes receiving a range specifying operation for performing range specification for at least part of the text displayed on a display device of the computer. Another aspect includes causing a storing unit to store therein specific text including text in the range specified by the received range specifying operation and other text relating to the specified range. Another aspect includes displaying the specific text stored in the storing unit together with the text in the specified range on the display device. Another aspect includes receiving a changing operation for changing the text in the specified range. Another aspect includes determining whether or not a change beyond a specific criterion has occurred in the text in the range specified by the received range specifying operation. Another aspect includes displaying the specific text stored in the storing unit on the display device based on determining that a change beyond the specific criterion has occurred in the text in the range.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIGS. 3(a)-3(c) illustrate examples of range specification for text.

FIG. 6(a)-6(b) illustrate examples of an embodiment in which text is additionally stored in accordance with a drag operation using a pointing device.

FIG. 7(a)-7(b) illustrate examples of an embodiment in which the position of a cursor is deviated from a position intended by an operator in a drag operation using a pointing device.

FIG. 8 is a diagram illustrating an embodiment of a range adjusting window.

FIG. 10(a)-10(b) illustrate an example of determining, using a rectangular region displayed in accordance with an operation for specifying a range of text, whether or not there is a possibility that an incorrect operation has been performed.

FIG. 11(a)-11(b) illustrate an example of determining, using a rectangular region displayed in accordance with an operation for specifying a range of text, whether or not there is a possibility that an incorrect operation has been performed.

DETAILED DESCRIPTION

Figure 1:
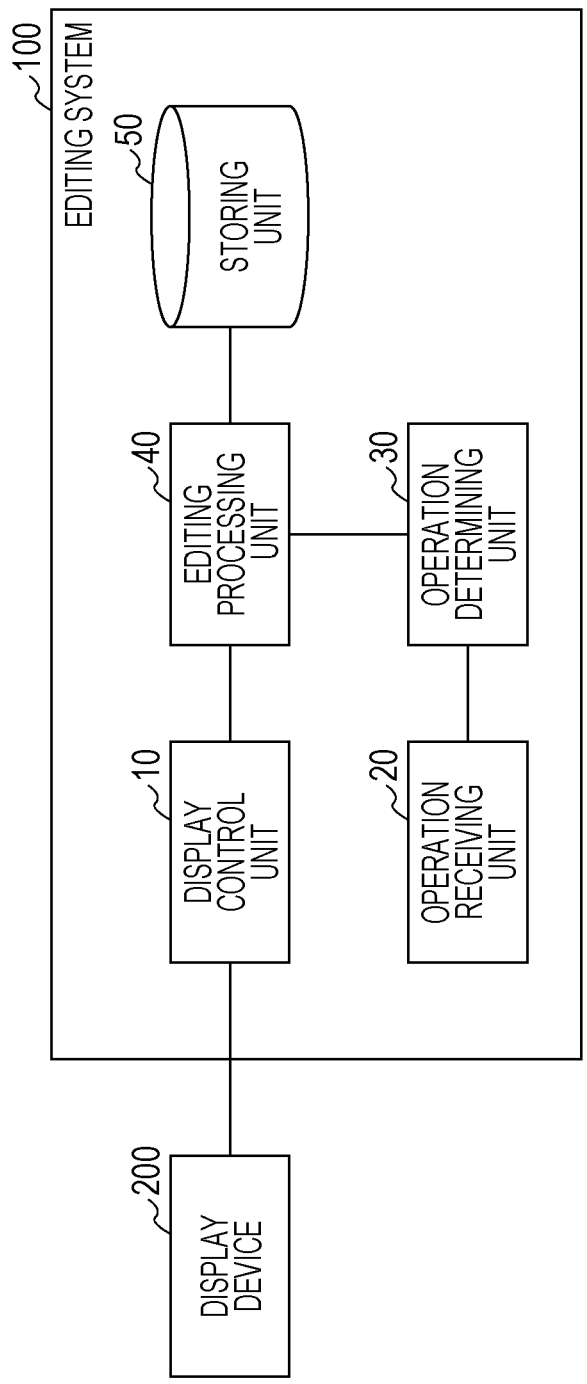
FIG. 1 is a diagram illustrating an embodiment of an editing system.

Embodiments of range adjustment for text editing are provided, with exemplary embodiments being discussed below in detail. When a range of text to be subjected to a copy operation or a cut operation is specified using a pointing device, such as a mouse, a range that is different from a range intended by an operator may be specified due to the hand motion of the operator who is operating the pointing device. In such a case, if the operator performs a paste operation with the incorrect range being specified, text not intended by the operator is pasted. An operator can be prevented from performing a paste operation while specifying an incorrect range in a copy operation or a cut operation, and an incorrect operation in text editing can be suppressed.

A text editing apparatus includes a display control unit that displays text to be edited on a display device; an operation receiving unit that receives a range specifying operation for performing range specification for at least part of the text displayed on the display device; a storing unit that stores therein specific text (specified range candidate text) including the text in the range specified by the range specifying operation received by the operation receiving unit and other text relating to the specified range; and an editing processing unit that causes, at a time of performing text pasting processing, the display control unit to display on the display device the specific text stored in the storing unit together with the text in the specified range, and performs, in a case where a changing operation for changing the text in the specified range is received, paste processing by changing text to be pasted in accordance with the changing operation. Furthermore, the apparatus is configured to further include a determining unit that determines whether or not a change beyond a specific criterion has occurred in the range of text specified by the range specifying operation received by the operation receiving unit. In a case where the determining unit determines that a change beyond the specific criterion has occurred in the range of the text, the editing processing unit causes the display control unit to display on the display device the specific text stored in the storing unit. In the apparatus, the storing unit may be configured to store, as the specific text, text in a specific range that includes the text in the range specified in accordance with the range specifying operation received by the operation receiving unit and that is defined on the basis of the specified range, together with the text in the specified range. Furthermore, the storing unit may be configured to additionally stores in a sequential manner, in accordance with progress of the range specifying operation received by the operation receiving unit, text in the range specified in the range specifying operation. The editing processing unit may be configured to cause the display control unit to display, as the specific text, text stored in a last storing operation and text for a specific number of storing operations from the last storing operation on the display device.

The editing processing unit may be configured to cause the display control unit to display the last stored text stored in the last storing operation and text for a specific number of storing operations from the last storing operation on the display device, and cause, in a case where an operation for selecting text that is different from the last stored text as text to be pasted in text pasting processing is received, the display control unit to display the specific text stored in the storing unit together with the selected text on the display device. In more detail, the determining unit periodically acquires from the display control unit positional information on a rectangular region displayed in order to represent the range of text specified in the range specifying operation, in accordance with progress of the range specifying operation, and determines, in a case where a rectangular region based on acquired positional information does not contain a rectangular region based on immediately previously acquired positional information, that a change beyond a specific criterion has occurred in the specified range of text. Furthermore, the determining unit may periodically acquires from the display control unit positional information on a cursor used in a range specifying operation, in accordance with progress of the range specifying operation, and determine, in a case where after the acquired positional information of the cursor is moved at display positions on the same row of the text displayed on the display device for a certain time or more, the positional information is moved to a display position in a different row, that a change beyond a specific criterion has occurred in the specified range of text.

Various embodiments are implemented as a data processing method for editing text using a computer. An embodiment of a method includes receiving a range specifying operation for performing range specification for at least part of the text displayed on a display device; causing a storing unit to store therein specific text (specified range candidate text) including text in the range specified by the received range specifying operation and other text relating to the specified range; displaying, at a time of performing text pasting processing, the specific text stored in the storing unit together with the text in the specified range on the display device; and performing, in a case where a changing operation for changing the text in the specified range is not received, paste processing for the text in the specified range, and performing, in a case where a changing operation for changing the text in the specified range is received, paste processing by changing the text to be pasted in accordance with the changing operation. The data processing method further includes determining whether or not a change beyond a specific criterion has occurred in the range of text specified by the received range specifying operation. At the time of performing the text pasting processing, the specific text stored in the storing unit may be displayed on the display device on a condition that it is determined that a change beyond the specific criterion has occurred in the range of text.

A program for controlling a computer to execute individual functions of the above-described apparatus or a program for causing a computer to perform processing corresponding the method described above is also provided. The program may be provided by being stored in a magnetic disk, an optical disk, a semiconductor memory, or other storage media and distributed or by being distributed via a network.

FIG. 1 is a diagram illustrating an embodiment of an editing system 100. As illustrated in FIG. 1, an editing system 100 according to this embodiment includes a display control unit 10, an operation receiving unit 20, an operation determining unit 30, an editing processing unit 40, and a storing unit 50. In addition, a display device 200, such as a liquid crystal display, is connected to the display control unit 10 of the editing system 100. The display control unit 10 displays various images on the display screen of the display device 200. More specifically, text data to be processed and a cursor are displayed. Furthermore, as described later, in the case where text in a specific range is specified by a cursor operation by an operator, a display manner is changed so that the specified range can be visually identified. Furthermore, in this embodiment, for execution of a paste operation for text, a window (hereinafter, called an operation window) for receiving an operation for text to be pasted is displayed on the display device 200. The details of display control for the operation window will be described later.

The operation receiving unit 20 acquires information on an operation performed by the operator using an input device such as a pointing device. Content of an operation to be acquired includes an operation for specifying a range of text, an operation for issuing an instruction to copy or cut the text in the specified range, an operation for specifying a specific position in text data and issuing an instruction to paste text, and the like. Furthermore, in this embodiment, the operation receiving unit 20 receives an operation for the operation window displayed on the display device 200 by the display control unit 10.

The operation determining unit 30 determines the content of an operation received by the operation receiving unit 20. More specifically, the operation determining unit 30 performs identification of an instructed operation (copy, cut, or paste), identification of text in a range specified in accordance with a copy operation or a cut operation, identification of a paste position to which the specified text is to be pasted in a paste operation, and the like. Here, the paste position is not necessarily a position in text for which a copy operation or a cut operation has been performed. The paste position may be a position (input form etc.) at which text can be displayed by a different application program. Furthermore, in this embodiment, in the case where there is a possibility that an incorrect range has been specified in an operation for specifying a range of text, the operation determining unit 30 detects the specification of an incorrect range. The details of determining processing for a specified range of text will be described later.

The editing processing unit 40 performs processing for editing text data on the basis of an operation received by the operation receiving unit 20 and determined by the operation determining unit 30. More specifically, the editing processing unit 40 performs processing corresponding to copy, cut, and paste operations. In copy processing, the editing processing unit 40 stores text in a specified range identified by the operation determining unit 30 into the storing unit 50. In cut processing, the editing processing unit 40 stores the text in the specified range identified by the operation determining unit 30 into the storing unit 50, and deletes the text in the specified range from the original text data. In the paste processing, the editing processing unit 40 inserts (pastes) text stored in the storing unit 50 to a paste position identified by the operation determining unit 30. Furthermore, when deleting text in cut processing or inserting text in paste processing, the editing processing unit 40 performs processing (changing of display position etc.) for the other text portions affected by deletion or insertion of the text. The storing unit 50 temporarily stores text that has been subjected to the copy processing or cut processing mentioned above. In general, an operating system (OS) of a computer provides a memory region called a clipboard, which is shared between application programs. For example, this memory region can be used as the storing unit 50.

Figure 2:
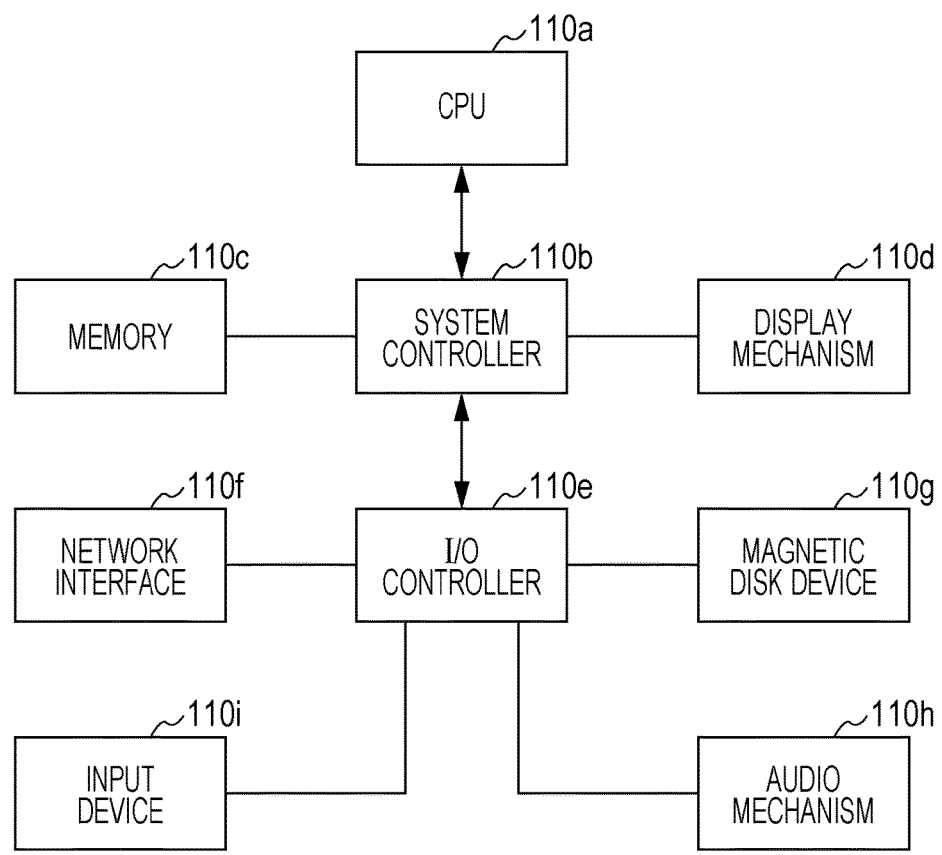
FIG. 2 is a diagram illustrating an embodiment a computer system for use in conjunction with an editing system.

FIG. 2 is a diagram illustrating an embodiment of a computer suitable for use with an editing system 100. The computer illustrated in FIG. 2 includes a central processing unit (CPU) 110a, which is arithmetic operation means, and a memory 110c, which is main storage means. Furthermore, the computer includes, as external devices, a magnetic disk device (hard disk drive or HDD) 110g, a network interface 110f, a display mechanism 110d, an audio mechanism 110h, and an input device 110i including a keyboard, a mouse, and the like. In FIG. 2, the memory 110c and the display mechanism 110d are connected through a system controller 110b to the CPU3 110a. The network interface 110f, the magnetic disk device 110g, the audio mechanism 110h, and the input device 110i are connected through an input/output (I/O) controller 110e to the system controller 110b. The individual components are connected to one another through various buses, such as a system bus, an input/output bus, and the like.

FIG. 2 illustrates merely an example of the hardware configuration of a computer to which editing system 100 is suitably applied. This embodiment is widely applicable to information processing systems that perform editing of text data including copy, cut, and paste processing, and this embodiment is not implemented only with the illustrated configuration.

Referring to FIG. 2, an operating system (OS) and an application program are stored in the magnetic disk device 110g. When these programs are read to the memory 110c and executed by the CPU 110a, the functions of the display control unit 10, the operation receiving unit 20, the operation determining unit 30, and the editing processing unit 40 illustrated in FIG. 1 are implemented. Furthermore, the storing unit 50 is implemented by storing means, such as the magnetic disk device 110g, the memory 110c, and the like. The display control unit 10 performs displaying of images on the display device 200 through the display mechanism 110d illustrated in FIG. 2. The operation receiving unit 20 acquires information on an operation performed by the operator using the input device 110i illustrated in FIG. 2.

Range specification for text performed in a copy operation or a cut operation will now be explained. Normally, range specification for text is performed, using an input device, by specifying the positions of the ends of a range to be specified. For example, in the case where a mouse is used as an input device, the mouse is operated so as to move a cursor (mouse pointer) and desired two positions are identified on the screen of the display device 200. More specifically, for example, an operation for pressing a mouse button when the cursor is located at one of the two identified positions, moving (dragging) the mouse with the mouse button kept pressed, and releasing the mouse button when the cursor reaches the other one of the identified positions is performed. When the operation receiving unit 20 receives such an operation, the operation determining unit 30 recognizes the range of text existing between the two identified positions as a specified range.

FIGS. 3(a)-3(c) illustrate examples of range specification for text. In an embodiment in which text is displayed on the display device 200, range specification may be performed for text in a range surrounded by a frame 301, as illustrated in FIG. 3(a). In this case, for example, a mouse is operated so as to move a cursor and to perform a drag operation from a position including the first character of text in a range to be specified (in the drawing "h" of text "http") to a position including the last character (in the drawing, "e" of text "update"). Accordingly, the positions are identified. As described above, a range of text existing between the identified positions (in the drawing, "http://RWP-Server_1/ccrc/update") is specified.

Information on identified positions on the screen by an operation using a mouse or the like and information on the display position of a character (coordinates on the screen etc.) are acquired, for example, by the display mechanism 110d illustrated in FIG. 2. The way how a range of text is specified on the basis of two identified positions depends on an application program for displaying text data. More specifically, for example, in the case of horizontally written text extending over a plurality of rows illustrated in FIG. 3(a), when a specified range includes a plurality of rows, text from an upper identified position to a lower identified position on the screen is defined as text in a specified range. In the case where a specified range includes one row, a left identified position to a right identified position on the screen is defined as text in a specified range.

FIG. 3(b) and FIG. 3(c) each illustrate the state in which a range represented by the frame 301 illustrated in FIG. 3(a) is intended to be specified using a mouse. In the illustrated examples, the operator intends to perform a mouse dragging operation from the left end toward the right end of the frame 301 illustrated in FIG. 3(a). In FIG. 3(b), the state in which a drag operation proceeds to the stage at which the range of a character string "http://RWP-S" is specified is illustrated.

Here, in the case of moving a cursor using a pointing device such as a mouse, since a physical operation or the like of the hand of an operator is reflected in a cursor operation on the screen, a moved cursor position may be deviated from the position intended by the operator. Normally, in this case, the operator is able to check the position of the cursor on the screen and make a modification. However, depending on the operation status, a situation in which a drag operation is terminated without the position of the cursor being modified and a range of text that is different from a range desired by the operator is defined as a specified range may occur.

For example, a situation in which at the time when a mouse button is released after a drag operation from one identified position to the other identified position is performed, the hand of the operator moves and the position of the cursor is changed may occur. FIG. 3(c) illustrates the state in which after a drag operation starts from the state illustrated in FIG. 3(b) and the drag operation for the entire character string "http://RWP-erver_1/ccrc/update" in a range to be specified is performed, the cursor moved to the row immediately above the original row when the mouse button is released. In this case, the identified positions do not include the position of "e" of "update" intended by the operator but include a position including "t" of "to" in the row immediately above the original row. Thus, the specified range is not "http://RWP-Server_1/ccrc/update" desired by the operator (range represented by the frame 301 of FIG. 3(a)) but the range "to this server and can be accessed using the following URL:" of text existing between two identified positions extending over two rows.

In the case where a range of text is incorrectly specified as described above, if an operator recognizes the incorrect operation before performing a copy operation, a cut operation, a paste operation, or the like, range specification can be performed again or modification of the specified range can be performed. However, the case where the operator does not recognize the incorrect operation for range specification until the operator performs a paste operation and views pasted text may occur. Under the circumstances mentioned above, this embodiment provides means for allowing the operator to adjust a specified range of text before the operator performs a paste operation.

In an embodiment, adjustment of a specified range may be applied when the operator performs a paste operation. A window for adjusting a specified range (hereinafter, called a range adjusting window) is displayed near a specified position for a paste operation on the screen of the display device 200. As a first adjusting method, text in a specific range including a range actually specified by an operation for specifying a range of text (hereinafter, called specified range candidate text) is displayed in the range adjusting window.

Figure 4:
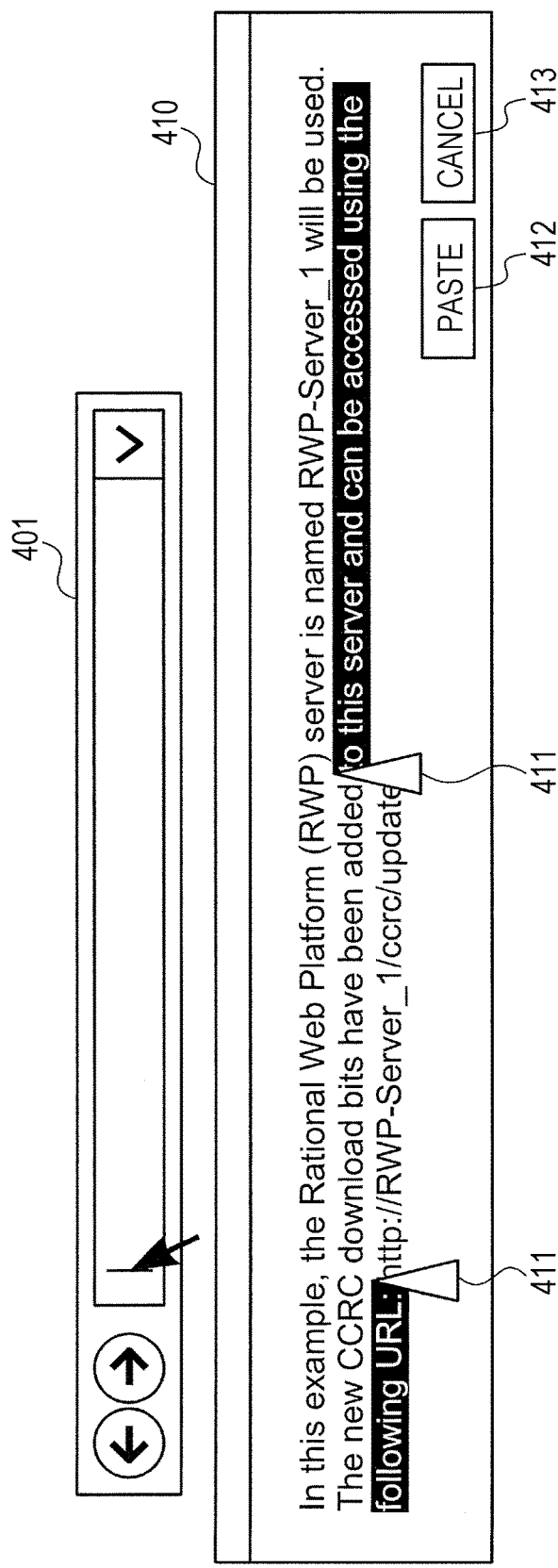
FIG. 4 is a diagram illustrating an embodiment of a range adjusting window.

FIG. 4 is a diagram illustrating an example of the display of a range adjusting window. In the example illustrated in FIG. 4, in a paste operation for pasting text to an input form 401 displayed on the screen of the display device 200, a range adjusting window 410 is displayed near a paste position. The position at which the range adjusting window 410 is displayed only needs to be a position not interfering with a paste operation. For example, the range adjusting window 410 is displayed near a lower portion of the paste position, as illustrated in the drawing. This displaying may adopt a method used for temporarily displaying a window, a dialog box, and the like in accordance with an existing application program or the like.

In this embodiment, specified range candidate text displayed in the range adjusting window 410 is text that includes text specified in a copy operation, a cut operation, or the like by the operator and that extends over a specific range before and after the specified text. In the example illustrated in FIG. 4, text "In this example, the Rational Web Platform (RWP) server is named RWP-Server_1 will be used. The new CCRC download bits have been added to this server and can be accessed using the following URL: http://RWP-Server_1/ccrc/update", which includes text "to this server and can be accessed using the following URL:" in the range incorrectly specified as illustrated in FIG. 3(c), is displayed as specified range candidate text.

Here, the range of text displayed as specified range candidate text is defined as a relative range based on the range of text specified by a range specifying operation, and settings for the size and the like of the specified range candidate text may be performed in advance in an appropriate manner by the operator. For example, specified range candidate text may be specified by specifying the number of characters and the number of rows before and after the range specified by a range specifying operation. Alternatively, the entire paragraph including the specified range may be defined as specified range candidate text. The range of text displayed as the specified range candidate text may be dynamically changeable in accordance with a specific operation including a range specifying operation, command inputting, and the like. For example, when markers 411, which will be described later, are set in the first row (or the last row) of the original set range (a range displayed in the range adjusting window 410), some rows above (or below) the first row (or the last row) may be set as specified range candidate text. Furthermore, at the time of executing a range specifying operation, inputting of a command for expanding the initially set range of the specified range candidate text forward or backward may be received.

Furthermore, as illustrated in FIG. 4, the text in the range actually specified by the range specifying operation of the specified range candidate text displayed in the range adjusting window 410 is displayed in a different display manner so that the text can be distinguished from the other text portions. Although inverse display is performed in the illustrated example, the display manner is not limited to the illustrated example. Various display manners, such as displaying in a different display color, adding embellishment such as an underline, and the like may be applied.

Furthermore, at positions of the ends of the specified range in the specified range candidate text in the range adjusting window 410, the markers 411 for changing the positions of the ends of the specified range are displayed. The markers 411 can be moved by performing a drag operation while positioning the cursor at the positions of the markers 411 using a pointing device such as a mouse. In addition to this, button objects 412 and 413 for inputting a command for terminating paste processing are displayed in the range adjusting window 410. The button object 412 is an object for pasting (inversely displayed) text in a specified range to a paste position and completing a paste operation. The button object 413 is an object for closing the range adjusting window 410 without pasting text (by cancelling a paste operation).

Figure 5A:
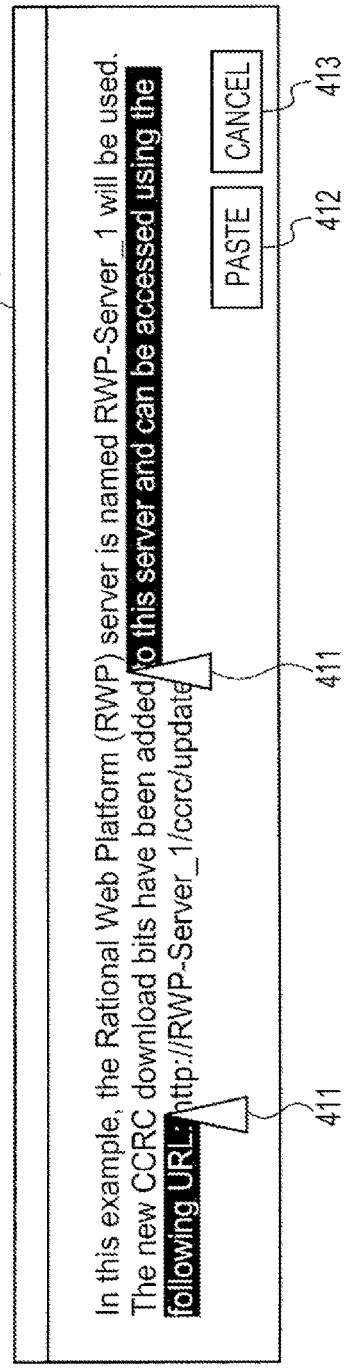
FIG. 5(a)-5(b) illustrates examples of adjustment of a specified range of text using a range adjusting window.
Figure 5B:
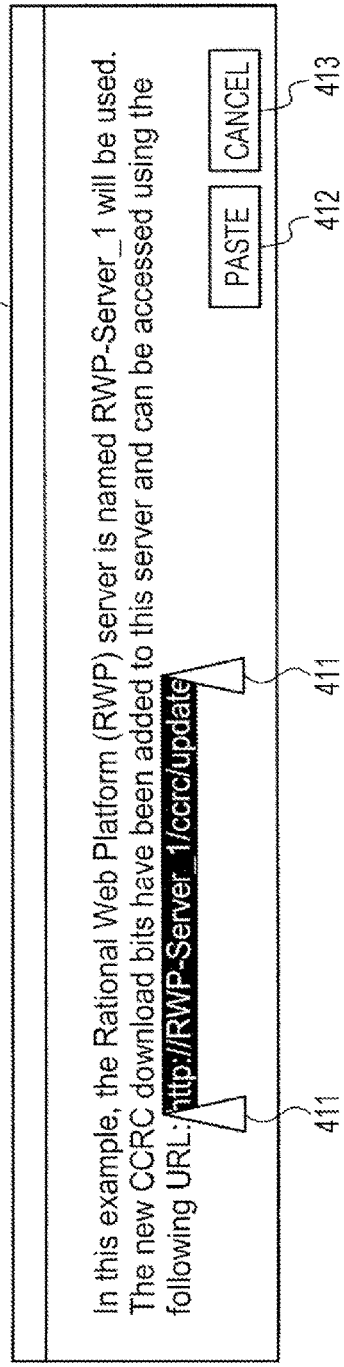

FIGS. 5(a)-5(b) illustrate examples of the adjustment of a specified range of text using the range adjusting window 410. In the range adjusting window 410 illustrated in FIG. 5(a), text "to this server and can be accessed using the following URL:" in the range incorrectly specified in FIG. 3(c) is inversely displayed and the markers 411 are displayed on the ends of the range. Here, in order to modify the specified range to the range of text surrounded by the frame 301 in FIG. 3(a), the operator moves the markers 411. More specifically, the operator moves the marker 411 located at the position of the initial character "t" in the inversely displayed range of text downward by one row to locate the marker 411 at a position including "e" of text "update". Accordingly, as illustrated in FIG. 5(b), the specified range sandwiched between the two markers 411 is changed, and "http://RWP-Server_1/ccrc/update" is defined as a specified range. When the button object 412 is clicked in this state, text in the modified specified range is pasted to the paste position (the input form 401 in FIG. 4).

In order to perform an operation using the range adjusting window 410 mentioned above, the processing described below is performed in the editing system 100 according to this embodiment illustrated in FIG. 1. First, in the case where an operation received by the operation receiving unit 20 is an operation for specifying a range of text, the operation determining unit 30 identifies specified range candidate text including text before and after the specified range, in accordance with settings for specified range candidate text performed in advance. Then, when the operation receiving unit 20 receives a copy operation or a cut operation, the editing processing unit 40 stores text in the specified range and the specified range candidate text into the storing unit 50. In the case where the range of the specified range candidate text is dynamically changeable, the operation determining unit 30 determines whether or not change conditions (in the example described above, the positions of the markers 411 and inputting of commands) are satisfied. When the change conditions are satisfied, specified range candidate text is identified in a range changed in accordance with the change conditions.

When the operation receiving unit 20 receives a paste operation, the display control unit 10 displays the range adjusting window 410 near the paste position, under the control of the editing processing unit 40. In the range adjusting window 410, the specified range candidate text is displayed in a display manner that is different from a display manner in which the other text portions are displayed. After that, when an operation for adjusting the specified range is performed, the editing processing unit 40 changes text in the specified range, in accordance with the operation. Furthermore, when a click operation for the button object 412 is performed, the editing processing unit 40 pastes the text in the specified range to the paste position.

As described above, according to this embodiment, at the time of performing a paste operation, the range adjusting window 410 is opened and specified range candidate text is displayed so that the operator can check and modify text in a specified range. Thus, text that has been subjected to incorrect range specification in a copy operation or a cut operation can be prevented from being pasted in a paste operation.

A second embodiment of an adjusting method using the range adjusting window 410 will now be explained. In the second adjusting method, when an operation for specifying a range of text is performed, text in a specified range is additionally stored into the storing unit 50 at specific time intervals during a drag operation using a pointing device. Then, the list of stored text is displayed in the range adjusting window 410.

FIG. 6(*a*)-6(*b*) illustrate an embodiment in which text is additionally stored in accordance with a drag operation using a pointing device. In the example illustrated in FIG. 6(*a*), as in the example illustrated in FIG. 3(*b*), the operator performs a drag operation using a mouse from the left end toward the right end of the frame 301 illustrated in FIG. 3(*a*). In FIG. 6(*a*), the state in which a drag operation proceeds to the stage at which the range of a character string "http://RWP-S" is specified is illustrated.

In FIG. 6(*b*), the state in which text is additionally stored in a sequential manner into the storing unit 50 is illustrated. More specifically, first, a character "h" included in a specified range is stored by a drag operation. Then, in accordance with the progress of the drag operation, character strings included in the specified range, "ht", "htt", "http", and so on, are sequentially stored into the storing unit 50.

The time intervals at which text is stored into the storing unit 50 may be determined on the basis of an operation clock or the like of a computer that implements the editing system 100, and can be set to, for example, between about several milliseconds and about several ten milliseconds. Thus, in the example illustrated in FIG. 6(*b*), additionally stored text increases by one character. However, depending on the speed of a drag operation, text may be stored while one or two characters being skipped over. For example, after "h" is stored, "htt" may be stored.

Meanwhile, in the case where the speed of a drag operation is low, when text is to be additionally stored, text included in a specified range may be the same as the text stored immediately previously. In such a case, in order to avoid the same text from being stored again, storing into the storing unit 50 may be skipped.

FIGS. 7(*a*)-7(*b*) illustrate an embodiment in which the position of a cursor is deviated from the position intended by the operator in a drag operation using a pointing device. In the example illustrated in FIG. 7(*a*), as in the example illustrated in FIG. 3(*c*), after a drag operation is performed for the entire character string "http://RWP-Server_1/ccrc/update" in a range to be specified, the cursor is moved to a row immediately above the original row when a mouse button is released. Thus, as illustrated in FIG. 7(*b*), the text stored in the storing unit 50 in the last storing operation is "to this server and can be accessed using the following URL:", and the text stored in the storing operation immediately before the last storing operation is "http://RWP-Server_1/ccrc/update".

FIG. 8 is a diagram illustrating an example of the display of the range adjusting window 410. In the range adjusting window 410 illustrated in FIG. 8, the list of text stored in the last storing operation to the fifth-to-last storing operation of a text group stored in the storing unit 50 illustrated in FIG. 7(*b*) is displayed as specified range candidate text. When the operator selects desired text from among the specified range candidate text displayed in the range adjusting window 410, the selected text is pasted to the paste position. In the example illustrated in FIG. 8, not text "to this server and can be accessed using the following URL:" stored into the storing unit 50 in the last storing operation, but text "http://RWP-Server_1/ccrc/update" stored immediately before the text "to this server and can be accessed using the following URL:" is selected (in FIG. 8, the selected text is highlighted in bold). As described above, with the adjusting means, for execution of a paste operation, the range adjusting window 410 is opened to display specified range candidate text so that the operator can check text in a specified range and select desired text. In addition, text that has been subjected to incorrect range specification in a copy operation or a cut operation can be prevented from being pasted in a paste operation.

In the above description, the case where when the speed of a drag operation is high relative to the time intervals at which text is stored into the storing unit 50, text is additionally stored by skipping several characters relative to the text stored immediately previously may occur has been explained. In this case, the case where text corresponding to text in a range that the operator intends to specify is not stored in the storing unit 50 may occur. More specifically, for example, in FIG. 7(*b*), the case where text that although the operator intends to specify is "http://RWP-Server_1/ccrc/update", text stored immediately before the last stored text is "http://RWP-Server_1/ccrc/updat" (the last "e" is missing) may occur.

In such a case, text that the operator intends to specify cannot be pasted in a paste operation only by displaying a text group stored in the storing unit 50 in the range adjusting window 410. Thus, the first adjusting method explained with reference to FIGS. 4 and 5 may be combined with the second adjusting method mentioned above. That is, in the case where text that is different from the last stored text is selected in the range adjusting window 410, as in the examples illustrated in FIGS. 4 and 5, text in a specific range including the last stored text is displayed as specified range candidate text in the range adjusting window 410, and modification for a specified range is received.

Figure 9:
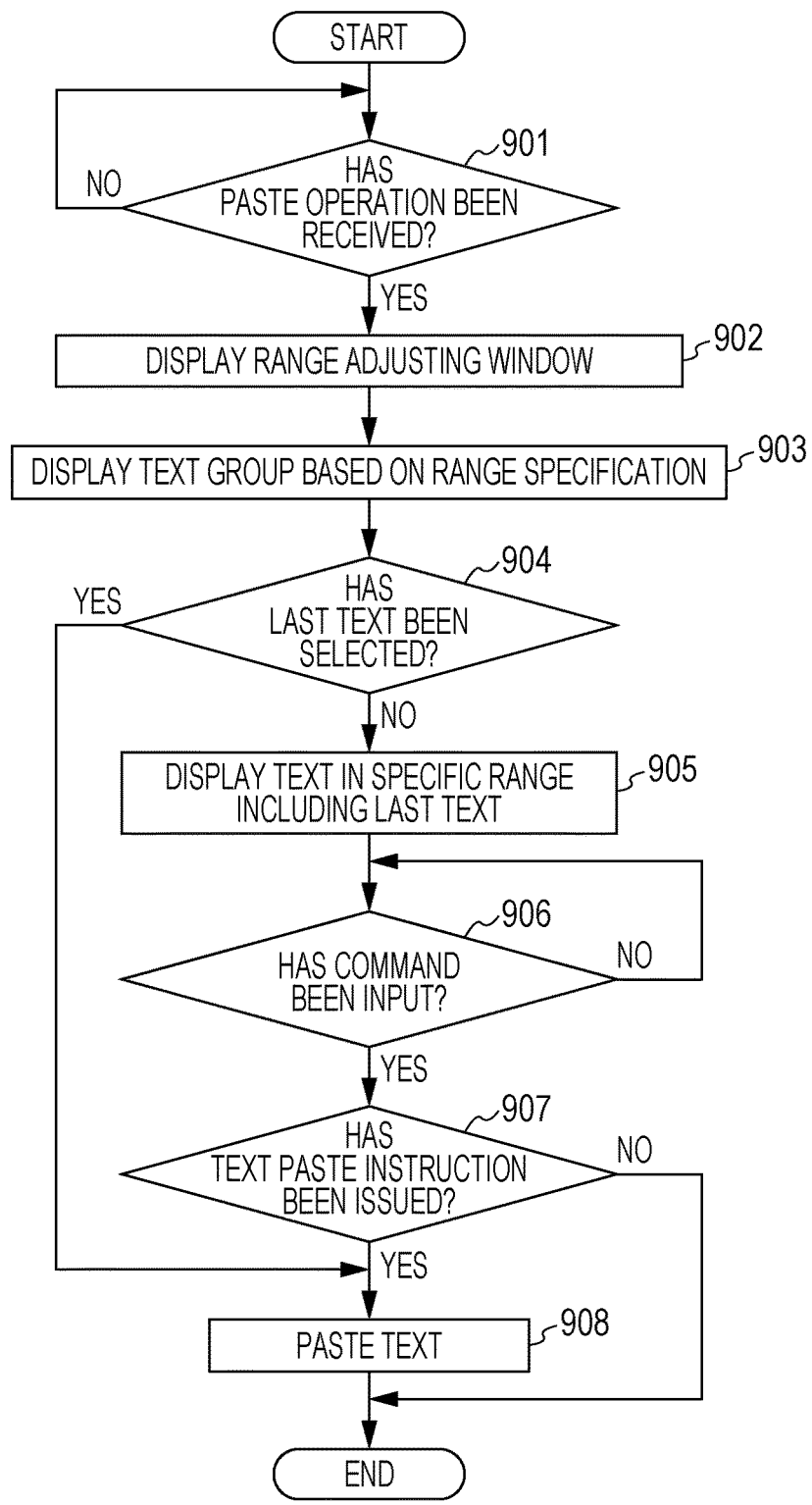
FIG. 9 is a flowchart illustrating an embodiment of a method of using a combination of a first adjusting method and a second adjusting method to adjust a specified range using the range adjusting window.

FIG. 9 is a flowchart illustrating an example of a method of using the combination of the first adjusting method and the second adjusting method in the means for adjusting a specified range using the range adjusting window 410. As illustrated in FIG. 9, a copy operation or a cut operation is performed by an operator. Then, when a paste operation is received (block 901), the editing processing unit 40 causes the range adjusting window 410 to be displayed on the display device 200 (block 902). Then, the editing processing unit 40 causes a text group stored in accordance with an operation for performing range specification for text in the copy operation or the cut operation to be displayed in the range adjusting window 410 (block 903).

Then, the editing processing unit 40 waits for execution of an operation for selecting text from the displayed text group. In the case where the last stored text is selected, the editing processing unit 40 pastes the selected text to a paste position, and terminates the process (blocks 904 and 908). Meanwhile, in the case where text that is different from the last stored text is selected, the editing processing unit 40 causes text in a specific range including the last stored text to be displayed in the range adjusting window 410 (blocks 904 and 905). Then, the editing processing unit 40 receives an operation for changing the specified range of text.

Then, the editing processing unit 40 waits input of a command for terminating paste processing (block 906). The inputting of a command is performed, for example, by clicking the button object 412 or 413 displayed in the range adjusting window 410 illustrated in FIGS. 4 and 5. When a command for pasting text is input, the editing processing unit 40 pastes text in the specified range in the specified range candidate text displayed in the range adjusting window 410 to the past position, and terminates the process (blocks 907 and 908). Meanwhile, when a command for cancelling a paste operation is input, the editing processing unit 40 terminates the process without pasting the text in the specified range to the paste position (block 907).

As described above, in this embodiment, for execution of a paste operation, a specified range of text can be adjusted using the range adjusting window 410. However, displaying the range adjusting window 410 and receiving an operation by an operator every time a paste operation is performed may be a complicated operation for the operator. Under such circumstances, detecting whether there is a possibility that an incorrect operation has been performed in an operation for specifying a range of text performed in a copy operation or a cut operation and displaying the range adjusting window 410 on the condition that such an incorrect operation is detected may be considered.

A method for detecting whether there is a possibility that an incorrect operation has been performed in an operation for specifying a range of text is further illustrated. In an embodiment, the editing processing unit 40 monitors an operation for specifying a range of text. In the case where a change in the content of an operation exceeds a specific criterion at a point in time, that is, in the case where an operation that is greatly different from the previous operations is performed, it is determined that there is a possibility that an incorrect operation has been performed. As a specific detecting method, in this embodiment, a method using a rectangular region displayed when an operation for specifying a range of text is performed (first detecting method) and a method using the displacement of a cursor operated by a pointing device (second detecting method) are suggested.

In the case where an operation for specifying a range of text is performed, the text in the specified range is normally highlighted on the screen of the display device 200 so that an operator can check the specified range. Regarding the display manner of highlighting, a rectangular region surrounding the text in the specified range is often displayed. Furthermore, in the rectangular region, a transparent color through which text is visible may be added. In the first detecting method, it is determined, on the basis of a change of the rectangular region, whether or not there is a possibility that an incorrect operation has been performed. Display information on a rectangular region representing a specified range of text on the screen of the display device 200 (information on the position, shape, size, the number of regions, and the like on the screen of the display device 200) can be acquired from the display control unit 10.

FIGS. 10(a)-10(b) and 11(a)-11(b) illustrate a method for determining, using a rectangular region displayed in accordance with an operation for specifying a range of text, whether or not there is a possibility that an incorrect operation has been performed. In general, as an operation performed when an operator specifies a desired range of text, a drag operation is performed using a pointing device from one end toward the other end of the specified range. In this case, display information of a rectangular region representing the specified range is acquired at appropriate time intervals (for example, between about several milliseconds and about several ten milliseconds). When a comparison is made, on the basis of the last acquired display information and the display information acquired immediately before the last acquired display information, between respective rectangular regions, the rectangular region for the last acquired display information contains the rectangular region for the display information acquired immediately before the last acquired display information. Referring to FIGS. 10 and 11, a specified range 1002 illustrated in FIG. 10(b) contains a specified range 1001 illustrated in FIG. 10(a). Furthermore, a specified range 1101 illustrated in FIG. 11(a) contains the specified range 1002 illustrated in FIG. 10(b).

In contrast, comparing FIG. 11(a) with FIG. 11(b), a specified range 1102 illustrated in FIG. 11(b) does not contain the specified range 1101 illustrated in FIG. 11(a). Here, in the case where a rectangular region based on display information acquired at a point in time does not contain a rectangular region based on display information acquired immediately before the display information acquired at the point in time, as illustrated in FIGS. 11(a) and (b), the editing processing unit 40 recognizes that a change beyond a specific criterion has occurred, and it is determined that there is a possibility that an incorrect operation has been performed.

Depending on the manner in which an operator operates a pointing device, even if an operation that greatly changes a rectangular region representing a specified range is performed as in the example illustrated in FIGS. 11(a) and (b), a correct range (intended by the operator) may be specified. However, in this embodiment, it is only required to detect an operation with the possibility of an incorrect operation. Thus, even in this case, there is no problem in that the range adjusting window 410 is displayed by determining that there is a possibility that an incorrect operation has been performed. The same applies to the case where during the process of a rage specifying operation, a rectangular region not including an immediately previous rectangular region appears due to a hand motion of an operator or the like.

In the second detecting method, in order to specify a range of text, it is determined, on the basis of the displacement (operation) of a cursor operated using a pointing device on the screen of the display device 200, whether or not there is a possibility that an incorrect operation has been performed. Positional information on a cursor on the screen of the display device 200 can be acquired from the display control unit 10. Furthermore, information on the display position of individual characters displayed on the screen of the display device 200 can be acquired from the display control unit 10. The second detecting method is suitable for the case where a specified range of text in a copy operation or a cut operation is a character string of one row (not extending over two or more rows).

Figure 12:
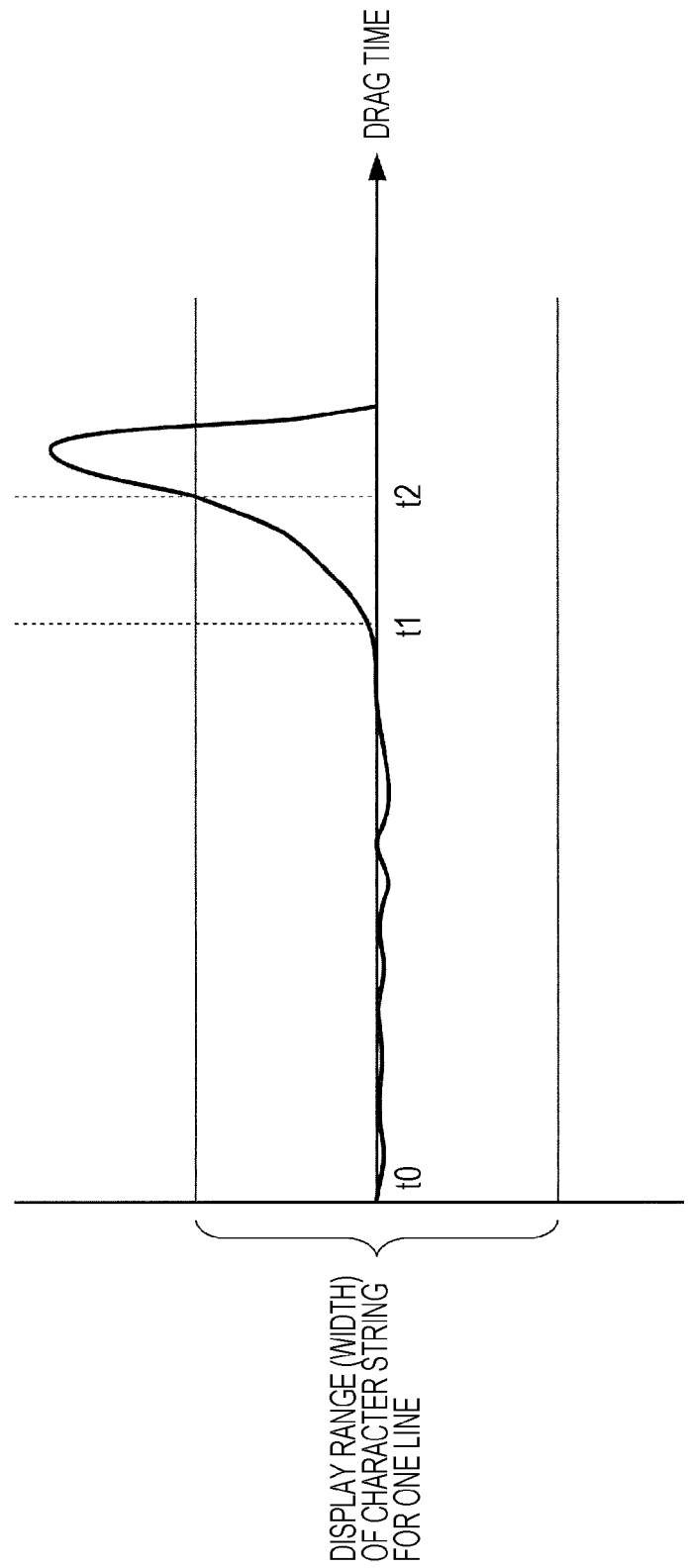
FIG. 12 illustrates an embodiment of a method of determining, on the basis of the displacement of a cursor in an operation for specifying a range of text, whether or not there is a possibility that an incorrect operation has been performed.

FIG. 12 is a diagram for explaining a method for determining, on the basis of the displacement of a cursor in an operation for specifying a range of text, whether or not there is a possibility that an incorrect operation has been performed. For specification of a range of text in a single row, an operator normally performs a drag operation using a pointing device in such a manner that a cursor is moved on a character string to be subjected to range specification from one end toward the other end of the range to be specified. That is, during the operation for specifying a range of text, the cursor should not be moved beyond the width for one row. Thus, the positional information of the cursor is acquired at appropriate time intervals (for example, between about several milliseconds and about several ten milliseconds), and it is determined whether or not the cursor is moved beyond the display range of the width of text in one row.

Referring to FIG. 12, the cursor is stably moved near the center of the character string from time t0, at which a drag operation for specifying a range of text starts, to time t1. Then, after time t1, the cursor is greatly moved in the width direction of the character string (vertical direction in horizontally written text), and the cursor is moved beyond the display range of the character string for one row at time t2. In this case, the editing processing unit 40 recognizes that a change beyond a specific criterion has occurred in the position of the cursor corresponding to the specified range, and determines that there is a possibility that an incorrect operation has been performed.

In the example illustrated in FIG. 12, after the cursor is moved beyond the display range of the character string for one row at time t2, the cursor is returned to the display range of the original row again. In this case, since a drag operation is eventually terminated for the character string for one row, displaying the range adjusting window 410 may be skipped by determining that an incorrect operation has not been performed. Furthermore, similar to the case of the first detecting method, it is only required to detect an operation having the possibility of an incorrect operation. Thus, even in this case, the range adjusting window 410 may be displayed by determining that there is a possibility that an incorrect operation has been performed.

Figure 13:
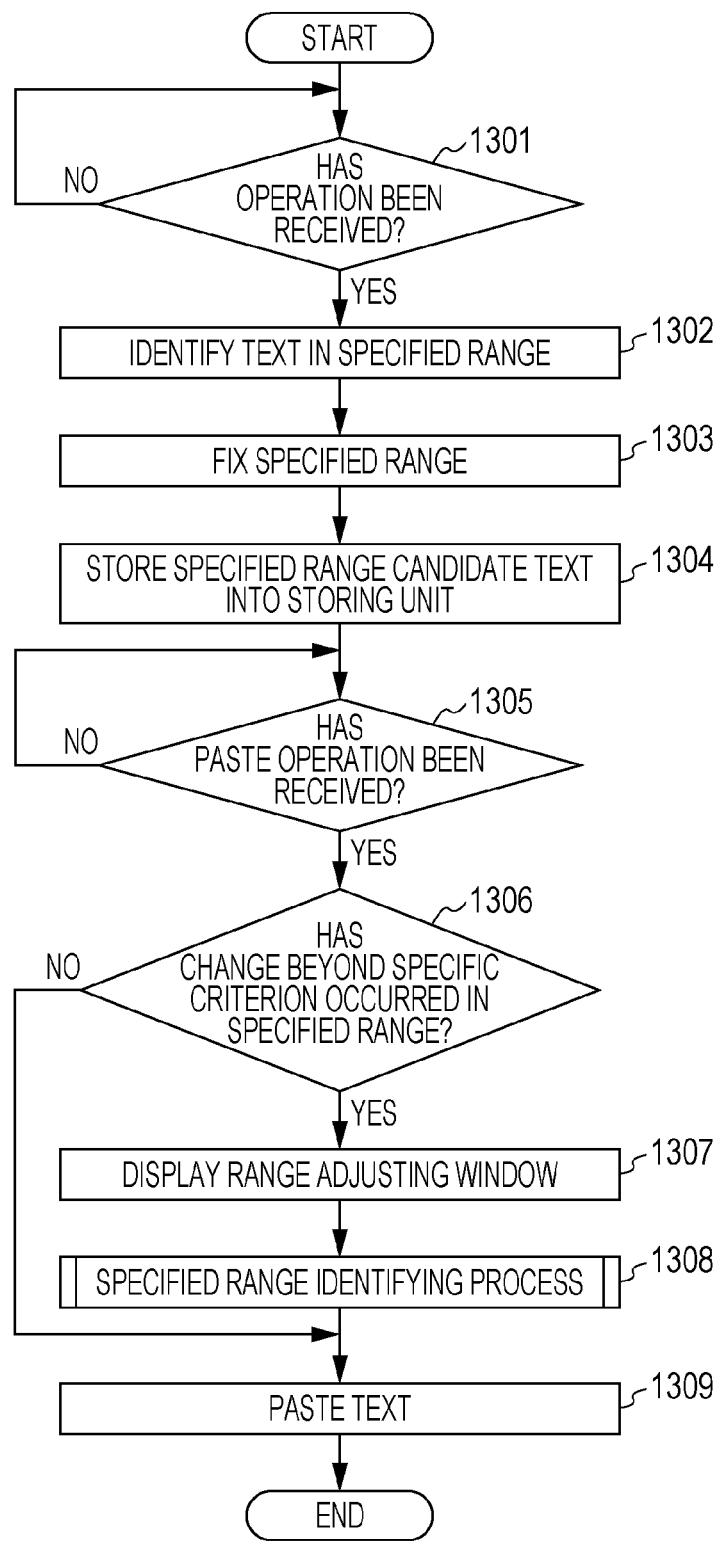
FIG. 13 is a flowchart illustrating an embodiment of a method for range specification of text and a paste operation in the embodiment.

FIG. 13 is a flowchart illustrating an embodiment of a method for range specification for text and a paste operation. As illustrated in FIG. 13, when an operation for specifying a range of text is performed at the time of performing a copy operation or a cut operation, the operation receiving unit 20 receives the range specifying operation (block 1301), and the operation determining unit 30 identifies text in the specified range (block 1302). Information on the identified specified range is stored into the storing unit 50 by the editing processing unit 40.

At this time, the operation determining unit 30 consecutively identifies at appropriate time intervals a specified range that changes in accordance with the progress of the operation for specifying a range of text. Then, the editing processing unit 40 additionally stores in a sequential manner information on the specified range identified by the operation determining unit 30 into the storing unit 50. Furthermore, the editing processing unit 40 determines, on the basis of the information on the specified range identified by the operation determining unit 30, whether or not a change beyond a specific criterion has occurred in the specified range during the operation for specifying a range.

When the copy operation or the cut operation is completed and the final specified range of text is fixed (block 1303), the editing processing unit 40 stores specified range candidate text including the text in the specified range into the storing unit 50 (block 1304). Then, when the operation receiving unit 20 receives a paste operation (block 1305), the editing processing unit 40 determines, on the basis of a change of the specified range during the operation for specifying a range, whether or not the range adjusting window 410 is to be displayed.

That is, in the case where during the operation for specifying a range, it is determined by the first detecting method or the second detecting method described above that a change beyond a specific criterion has occurred in the specified range during the operation, the range adjusting window 410 is displayed (blocks 1306 and 1307). Then, after processing for identifying the specified range is performed (block 1308), text in the identified specified range is pasted to a paste position (block 1309). Meanwhile, in the case where it is determined that a change beyond the specific criterion has not occurred in the specified range during the operation for specifying a range of text, the range adjusting window 410 is not displayed, and the text in the specified range fixed in block 1303 is pasted to the paste position (blocks 1306 and 1309).

In the process mentioned above, in the case where a change beyond a specific criterion has occurred in a specified range during an operation for specifying a range of text, the range adjusting window 410 is displayed and processing for identifying a specified range is performed. In contrast, irrespective of a change of a specified range during an operation, the range adjusting window 410 may be always displayed at the time of a paste operation, and processing for identifying a specified range may be performed.

Figure 14:
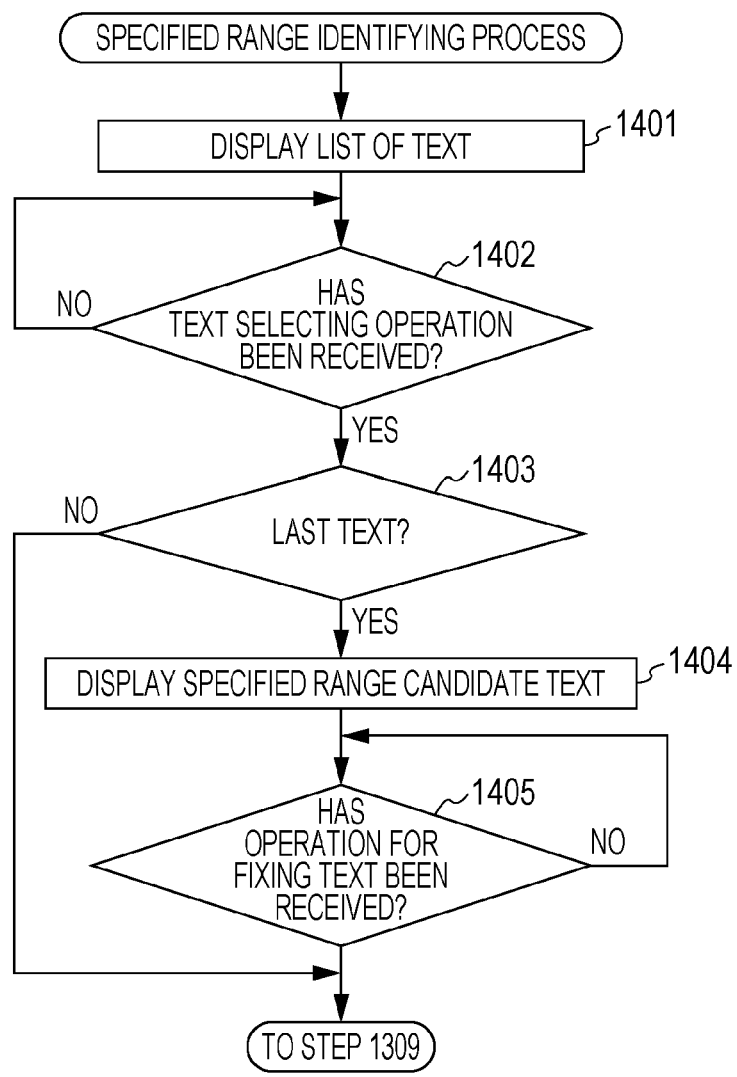
FIG. 14 is a flowchart illustrating an embodiment of a method for identifying a specified range.

FIG. 14 is a flowchart illustrating an embodiment of a method for identifying a specified range illustrated in block 1308 of FIG. 13. After displaying the range adjusting window 410 in block 1307 of FIG. 13, the editing processing unit 40 displays on the range adjusting window 410 the list of text for the last storing operation and a specific number of storing operations from the last storing operation of text additionally stored in the storing unit 50 in accordance with a range specifying operation (block 1401). Then, when the operation receiving unit 20 receives an operation for selecting text displayed in the range adjusting window 410 (block 1402), the editing processing unit 40 determines whether or not the selected text is the last stored text (block 1403). In the case where the selected text is the last stored text, the editing processing unit 40 proceeds to block 1309 in FIG. 13 while defining the selected text as text to be pasted.

Meanwhile, in the case where the selected text is text that is different from the last stored text in the storing unit 50, the editing processing unit 40 then displays in the range adjusting window 410 specified range candidate text including the last stored text stored in the storing unit 50 (blocks 1403 and 1404). Then, when the operation receiving unit 20 receives an operation for fixing text in the specified range from the specified range candidate text (block 1405), the editing processing unit 40 proceeds to block 1309 in FIG. 13 while defining the text in the fixed specified range as text to be pasted. At this time, if the specified range is changed by an operation for the specified range candidate text, the text in the specified range fixed in the processing of block 1405 differs from the text in the specified range fixed in block 1303.

In method of FIG. 14, after an operation for selecting text in a specified range on the basis of text for several storing operations additionally stored into the storing unit 50 in accordance with range specifying operations is received, specified range candidate text is displayed in the range adjusting window 410 on the basis of specific conditions. Meanwhile, specified range candidate text may be initially displayed in the range adjusting window 410 without receiving selection based on text additionally stored in several storing operations.

As described above, in this embodiment, at the time of a paste operation, the range adjusting window 410 is displayed, so that a specified range can be adjusted on the basis of text additionally stored in several storing operations in accordance with an operation for specifying a range and specified range candidate text. Meanwhile, an embodiment in which in the case where the editing processing unit 40 determines, on the basis of text additionally stored in accordance with a range specifying operation (history of range specifying operation), that an incorrect operation has been performed, the text in the specified range is modified to text in a range estimated to be a correct specified range and paste processing is performed can be implemented.

For example, by using history of range specifying operation, each piece of text stored in the storing unit 50 is compared with the text stored immediately before the text. In the case where there is a big difference only between the last stored text and the text immediately before the last stored text as illustrated in FIG. 7, there is a high possibility that an incorrect operation occurs at the time when a drag operation using a pointing device is terminated. Thus, in such a case, the editing processing unit 40 pastes not the last stored text but the text immediately before the last stored text to a paste position. Then, as an option menu to be performed in accordance with a click operation or the like using a pointing device, displaying of the range adjusting window 410 may be performed.

It should be noted that the term "comprising" does not exclude other elements or blocks and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The technical effects and benefits of exemplary embodiments include automatic installation and configuration of a software appliance across a variety of computing systems.

The terminology used herein is for the purpose of describing particular embodiments only and is not intended to be limiting of the claims. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description has been presented for purposes of illustration and description, but is not intended to be exhaustive or limited in the form disclosed. Many modifications and variations will be apparent to those of ordinary skill in the art without departing from the scope and spirit of the disclosure. The embodiment was chosen and described in order to best explain the principles and the practical application, and to enable others of ordinary skill in the art to understand the disclosure for various embodiments with various modifications as are suited to the particular use contemplated.

The invention claimed is:

1. A text editing apparatus comprising:
a display control unit that displays text to be edited on a display device;
an operation receiving unit that receives a range specifying operation for performing range specification for at least part of the text displayed on the display device;
a storing unit that stores therein specific text including the text in the range specified by the range specifying operation received by the operation receiving unit and other text relating to the specified range; and
an editing processing unit that causes the display control unit to display on the display device the specific text stored in the storing unit together with the text in the specified range, and receives a changing operation for changing the text in the specified range;
a determining unit that determines whether or not a change beyond a specific criterion has occurred in the text in the range specified by the range specifying operation received by the operation receiving unit, wherein based on the determining unit determining that a change beyond the specific criterion has occurred in the range of the text, the editing processing unit causes the display control unit to display on the display device the specific text stored in the storing unit,
wherein the determination of whether or not a change beyond a specific criterion has occurred further includes determining if an incorrect selection has occurred which is based on the text in the range specified by the range specifying operation, wherein the text in the range does not contain a second text that was acquired by the range specifying operation immediately before a point in time at which the text was acquired.

2. The apparatus according to claim 1, the editing processing unit further configured to perform, based on the changing operation for changing the text in the specified range being received, paste processing by changing text to be pasted in accordance with the changing operation, wherein the causing to display on the display device the specific text stored in the storing unit together with the text in the specified range is performed at a time of performing the paste processing.

3. The apparatus according to claim 1, wherein the storing unit stores, as the specific text, text in a specific range that includes the text in the range specified in accordance with the range specifying operation received by the operation receiving unit and that is defined based on the specified range, together with the text in the specified range.

4. The apparatus according to claim 1, wherein the storing unit additionally stores in a sequential manner, in accordance with progress of the range specifying operation received by the operation receiving unit, text in the range specified in the range specifying operation; and
wherein the editing processing unit causes the display control unit to display, as the specific text, text stored in a last storing operation and text for a specific number of storing operations from the last storing operation on the display device.

5. The apparatus according to claim 1, wherein the storing unit additionally stores in a sequential manner, in accordance with progress of the range specifying operation received by the operation receiving unit, text in the range specified by the range specifying operation, and stores, as the specific text, text in a specific range that includes last stored text that is stored in a last storing operation and that is defined based on the specified range, together with the last stored text; and
wherein the editing processing unit causes the display control unit to display the last stored text stored in the last storing operation and text for a specific number of storing operations from the last storing operation on the display device, and causes, based on an operation for selecting text that is different from the last stored text as text to be pasted in text pasting processing being received, the display control unit to display the specific text stored in the storing unit together with the selected text on the display device.

6. The apparatus according to claim 2, wherein the determining unit periodically acquires from the display control unit positional information on a rectangular region displayed in order to represent the text in the range specified in the range specifying operation, in accordance with progress of the range specifying operation, and determines, based on a rectangular region of acquired positional information not containing a rectangular region based on immediately previously acquired positional information, that a change beyond a specific criterion has occurred in the specified range of text.

7. The apparatus according to claim 2, wherein the determining unit periodically acquires from the display control unit positional information on a cursor used in a range specifying operation, in accordance with progress of the range specifying operation, and determines, based on, after the cursor is at a display position on a same row of the text displayed on the display device for a certain time or more, the cursor is moved to a display position in a different row, that a change beyond a specific criterion has occurred in the specified range of text.

8. A method for editing text using a computer, the method comprising:
receiving a range specifying operation for performing range specification for at least part of the text displayed on a display device of the computer;
causing a storing unit to store therein specific text including text in the range specified by the received range specifying operation and other text relating to the specified range;
displaying the specific text stored in the storing unit together with the text in the specified range on the display device;
receiving a changing operation for changing the text in the specified range;
determining whether or not a change beyond a specific criterion has occurred in the text in the range specified by the received range specifying operation, wherein the determination further includes determining if an incorrect selection has occurred which is based on the text in the range specified by the range specifying operation, wherein the text in the range does not contain a second text that was acquired by the range specifying operation immediately before a point in time at which the text was acquired; and
displaying the specific text stored in the storing unit on the display device based on determining that a change beyond the specific criterion has occurred in the text in the range.

9. The data processing method according to claim 8, further comprising:
performing, based on the changing operation for changing the text in the specified range being received, paste processing by changing text to be pasted in accordance with the changing operation, wherein the displaying on the display device the specific text stored in the storing unit together with the text in the specified range is performed at a time of performing the paste processing.

10. The data processing method according to claim 8, wherein the storing unit stores, as the specific text, text in a specific range that includes the text in the range specified in accordance with the range specifying operation received by the operation receiving unit and that is defined based on the specified range, together with the text in the specified range.

11. The data processing method according to claim 8, wherein the storing unit additionally stores in a sequential manner, in accordance with progress of the range specifying operation received by the operation receiving unit, text in the range specified in the range specifying operation; and further comprising displaying, as the specific text, text stored in a last storing operation and text for a specific number of storing operations from the last storing operation on the display device.

12. The data processing method according to claim 8, wherein the storing unit additionally stores in a sequential manner, in accordance with progress of the range specifying operation received by the operation receiving unit, text in the range specified by the range specifying operation, and stores, as the specific text, text in a specific range that includes last stored text that is stored in a last storing operation and that is defined based on the specified range, together with the last stored text; and
wherein the editing processing unit causes the display control unit to display the last stored text stored in the last storing operation and text for a specific number of storing operations from the last storing operation on the display device, and causes, based on an operation for selecting text that is different from the last stored text as text to be pasted in text pasting processing being received, the display control unit to display the specific text stored in the storing unit together with the selected text on the display device.

13. The data processing method according to claim 9, further comprising periodically acquiring positional information on a rectangular region displayed in order to represent the text in the range specified in the range specifying operation, in accordance with progress of the range specifying operation, and determining, based on a rectangular region of acquired positional information not containing a rectangular region based on immediately previously acquired positional information, that a change beyond a specific criterion has occurred in the specified range of text.

14. The data processing method according to claim 9, further comprising periodically acquiring from the display control unit positional information on a cursor used in a range specifying operation, in accordance with progress of the range specifying operation, and determining, based on, after the cursor is at a display position on a same row of the text displayed on the display device for a certain time or more, the cursor is moved to a display position in a different row, that a change beyond a specific criterion has occurred in the specified range of text.

15. A computer program product for text editing, the computer program product comprising a non-transitory storage medium having computer-readable program code embodied therewith, which when executed by a computer processor, causes the computer processor to implement:
   receiving a range specifying operation for performing range specification for at least part of the text displayed on a display device of the computer;
   causing a storing unit to store therein specific text including text in the range specified by the received range specifying operation and other text relating to the specified range;
   displaying the specific text stored in the storing unit together with the text in the specified range on the display device;
   receiving a changing operation for changing the text in the specified range;
   determining whether or not a change beyond a specific criterion has occurred in the text in the range specified by the received range specifying operation, wherein the determination further includes determining if an incorrect selection has occurred which is based on the text in the range specified by the range specifying operation, wherein the text in the range does not contain a second text that was acquired by the range specifying operation immediately before a point in time at which the text was acquired; and
   displaying the specific text stored in the storing unit on the display device based on determining that a change beyond the specific criterion has occurred in the text in the range.

16. The computer program product according to claim 15, further comprising:
   performing, based on the changing operation for changing the text in the specified range being received, paste processing by changing text to be pasted in accordance with the changing operation, wherein the displaying on the display device the specific text stored in the storing unit together with the text in the specified range is performed at a time of performing the paste processing.

17. The computer program product according to claim 15, wherein the storing unit stores, as the specific text, text in a specific range that includes the text in the range specified in accordance with the range specifying operation received by the operation receiving unit and that is defined based on the specified range, together with the text in the specified range.

18. The computer program product according to claim 15, wherein the storing unit additionally stores in a sequential manner, in accordance with progress of the range specifying operation received by the operation receiving unit, text in the range specified in the range specifying operation; and further comprising displaying, as the specific text, text stored in a last storing operation and text for a specific number of storing operations from the last storing operation on the display device.

19. The computer program product according to claim 15, wherein the storing unit additionally stores in a sequential manner, in accordance with progress of the range specifying operation received by the operation receiving unit, text in the range specified by the range specifying operation, and stores, as the specific text, text in a specific range that includes last stored text that is stored in a last storing operation and that is defined based on the specified range, together with the last stored text; and
   wherein the editing processing unit causes the display control unit to display the last stored text stored in the last storing operation and text for a specific number of storing operations from the last storing operation on the display device, and causes, based on an operation for selecting text that is different from the last stored text as text to be pasted in text pasting processing being received, the display control unit to display the specific text stored in the storing unit together with the selected text on the display device.

20. The computer program product according to claim 16, further comprising periodically acquiring positional information on a rectangular region displayed in order to represent the text in the range specified in the range specifying operation, in accordance with progress of the range specifying operation, and determining, based on a rectangular region of acquired positional information not containing a rectangular region based on immediately previously acquired positional information, that a change beyond a specific criterion has occurred in the specified range of text.

* * * * *